(12) United States Patent
Muff

(10) Patent No.: US 9,090,298 B2
(45) Date of Patent: Jul. 28, 2015

(54) SEAT PILLAR

(76) Inventor: Andre Armando Muff, Zurich (CH)

(*) Notice: Subject to any disclaimer, the term of this patent is extended or adjusted under 35 U.S.C. 154(b) by 125 days.

(21) Appl. No.: 14/000,944

(22) PCT Filed: Feb. 27, 2012

(86) PCT No.: PCT/EP2012/053273
§ 371 (c)(1),
(2), (4) Date: Aug. 22, 2013

(87) PCT Pub. No.: WO2012/116955
PCT Pub. Date: Sep. 7, 2012

(65) Prior Publication Data
US 2013/0327916 A1    Dec. 12, 2013

(30) Foreign Application Priority Data
Mar. 1, 2011  (DE) .................. 10 2011 000 990

(51) Int. Cl.
  *B62J 1/10* (2006.01)
  *B62J 1/08* (2006.01)
  *B62J 1/04* (2006.01)

(52) U.S. Cl.
  CPC .... *B62J 1/08* (2013.01); *B62J 1/04* (2013.01); *B62K 2201/02* (2013.01)

(58) Field of Classification Search
  CPC ..................................... B62J 1/08; B62J 1/04
  USPC .............. 248/573, 634, 229.14, 228.5, 230.5, 248/231.61, 560; 280/220, 275, 283; 297/195.1, 205, 207, 215.14; 267/131, 267/132, 133, 258; 403/389
  See application file for complete search history.

(56) References Cited

U.S. PATENT DOCUMENTS

| | | | |
|---|---|---|---|
| 5,082,252 A * | 1/1992 | Miyamoto | 267/140.13 |
| 5,333,826 A * | 8/1994 | Lai | 248/229.14 |
| 5,788,209 A * | 8/1998 | Dandre et al. | 267/219 |
| 6,260,918 B1 * | 7/2001 | Lee | 297/195.1 |
| 6,276,706 B1 * | 8/2001 | Yih | 280/284 |
| 6,364,292 B1 * | 4/2002 | Chen et al. | 267/131 |
| 6,520,465 B1 * | 2/2003 | Sack et al. | 248/227.4 |
| 6,561,579 B1 * | 5/2003 | Weir | 297/195.1 |
| 6,688,684 B2 * | 2/2004 | Huang | 297/195.1 |
| 7,144,029 B1 * | 12/2006 | Heady | 280/288.4 |

(Continued)

FOREIGN PATENT DOCUMENTS

| | | |
|---|---|---|
| DE | 91 14 876 U1 | 3/1993 |
| DE | 4139284 A1 | 6/1993 |

(Continued)

*Primary Examiner* — Terrell McKinnon
*Assistant Examiner* — Michael McDuffie
(74) *Attorney, Agent, or Firm* — Lucas & Mercanti, LLP

(57) ABSTRACT

The invention relates to a seat pillar with a seat pillar tube, a seat pillar head fastened to one of the two ends of the seat pillar tube, and a clamping device, which is arranged on the seat pillar head, for a seat frame.

In order to provide a seat pillar which, in particular in the case of sports bikes, reduces the high loadings in the genitals/perineum region of the cyclist and restricts the maximum pivoting angle of the clamping device from a starting position, it is proposed that the seat pillar head has a pivot axis which runs perpendicularly to the longitudinal axis of the seat pillar tube, and the clamping device is arranged pivotably about a defined pivot axis counter to the force of a spring element, wherein the pivoting angle is restricted by stop means integrated in the seat pillar head.

8 Claims, 4 Drawing Sheets

(56) References Cited

U.S. PATENT DOCUMENTS

| | | | |
|---|---|---|---|
| 7,637,472 B2 * | 12/2009 | Endo | 248/610 |
| 7,997,603 B2 * | 8/2011 | Petrie et al. | 280/275 |
| 8,083,289 B2 * | 12/2011 | Chang | 297/215.15 |
| 2002/0166941 A1 * | 11/2002 | Dunlap | 248/599 |
| 2005/0225132 A1 * | 10/2005 | Tisue | 297/195.1 |
| 2010/0199481 A1 | 8/2010 | Petrie | |
| 2011/0163515 A1 * | 7/2011 | Cusack | 280/283 |
| 2011/0210231 A1 * | 9/2011 | D'Aluisio | 248/629 |

FOREIGN PATENT DOCUMENTS

| | | |
|---|---|---|
| DE | 20 2008 007 503 U1 | 10/2008 |
| EP | 2 343 232 A1 | 7/2011 |
| WO | 2009/029115 A1 | 3/2009 |

* cited by examiner

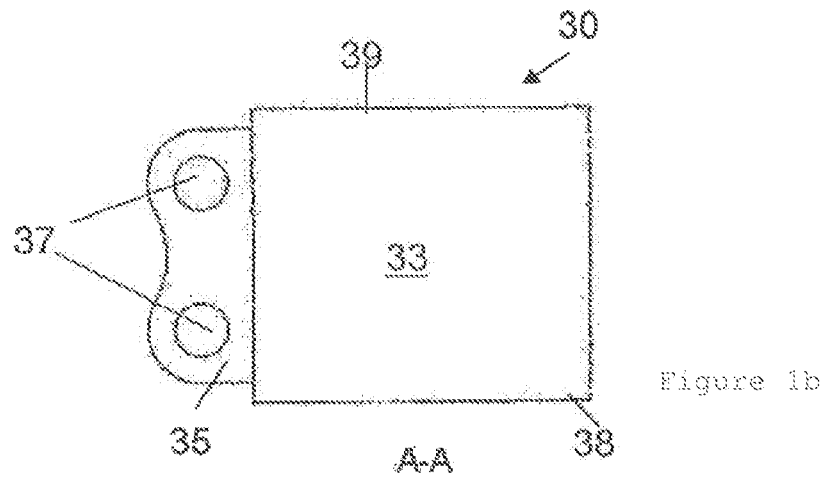
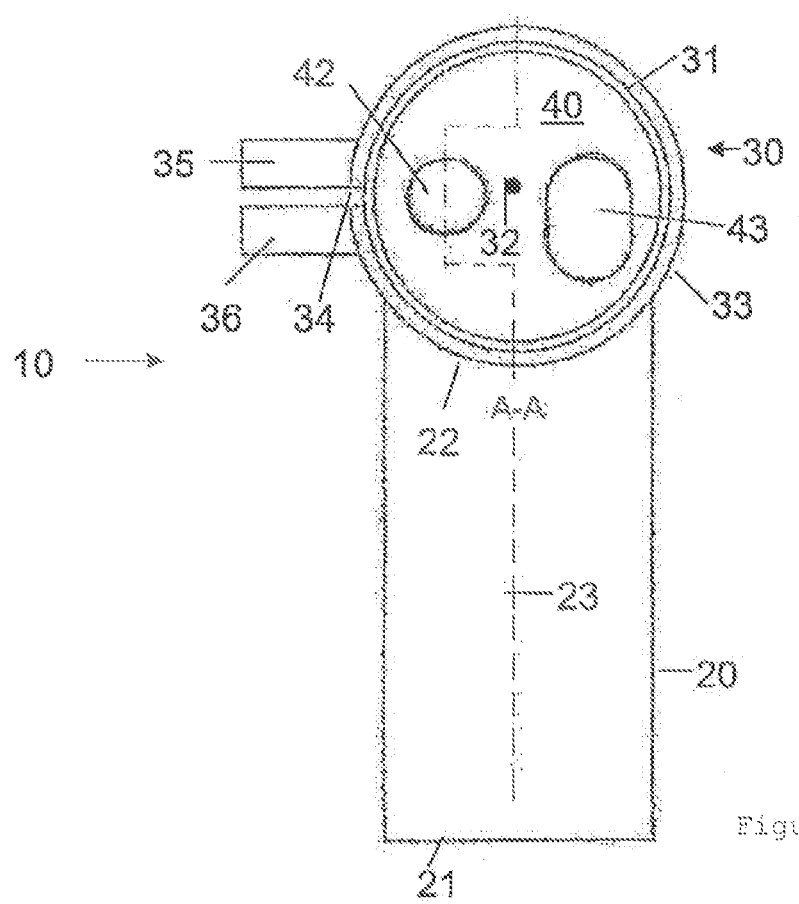

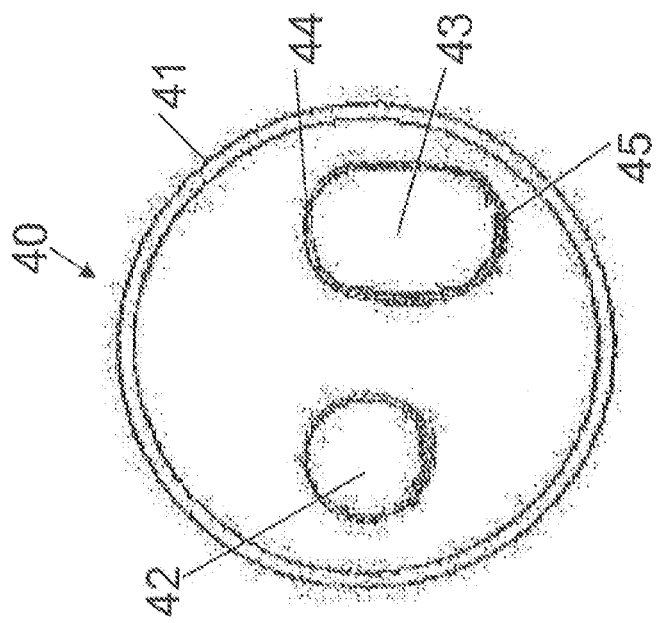
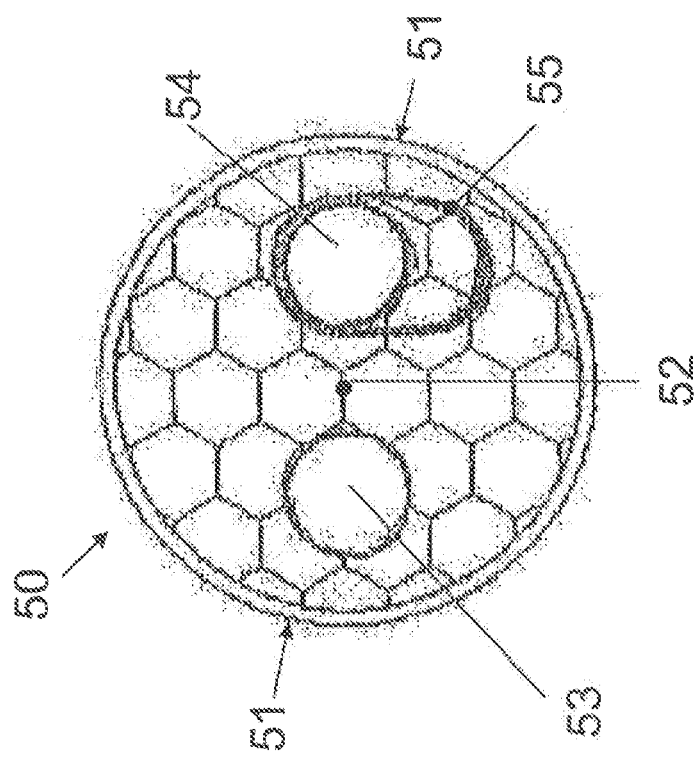
Figure 3b
Figure 3a

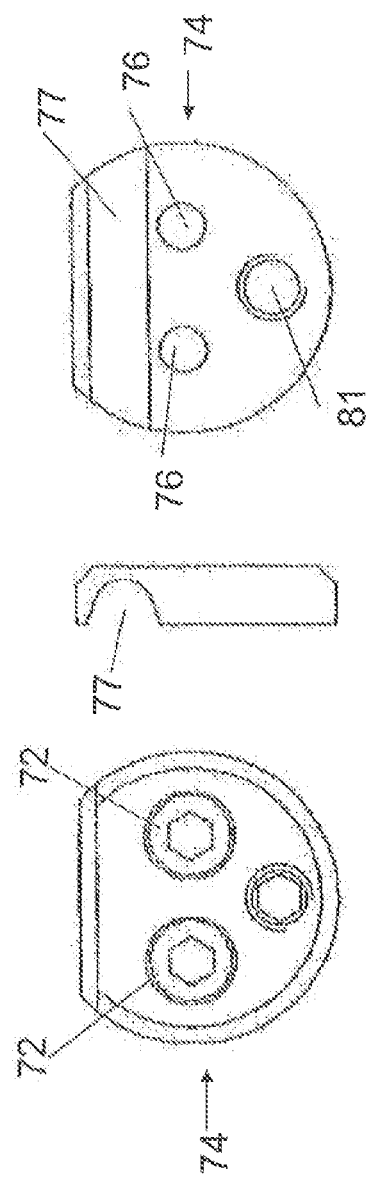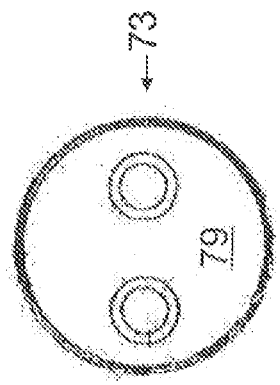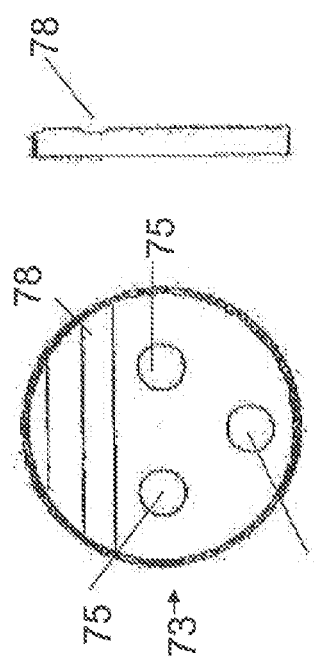

SEAT PILLAR

CROSS-REFERENCE TO RELATED APPLICATIONS

This application is a 371 of PCT/EP2012/053273 filed Feb. 27, 2012, which in turn claims the priority of DE 10 2011 000 990.6 filed Mar. 1, 2011, the priority of both applications is hereby claimed and both applications are incorporated by reference herein.

BACKGROUND OF THE INVENTION

The invention relates to a seat pillar with a seat pillar tube, a seat pillar head fastened to one of the two ends of the seat pillar tube, and a clamping device, which is arranged on the seat pillar head, for a seat frame, wherein the seat pillar head is configured as a hollow-cylindrical sleeve and has a pivot axis which runs perpendicularly to the longitudinal axis of the seat pillar tube, and the clamping device is arranged pivotably about the pivot axis counter to the force of a spring element.

The seat pillar comprises a seat pillar tube which is made from steel, aluminum, titanium or carbon-fiber-reinforced plastic and is fixed at one end in the seat tube of the bicycle frame. The seat pillar head is located at the opposite end together with the clamping device for the seat frame supporting the seat.

In particular on sports bikes, the cyclist repeatedly takes up a posture in which the upper body is inclined obliquely forwards. In said inclined posture, the pressure loading of the cyclist in the genitals/perineum region increases because of the seat tip. Said high loading is not compensated for by spring-mounted seat pillars known from the prior art. In conventional, spring-mounted seat pillars, the spring acts in the direction of the seat pillar tube. During cycling over unevennesses in a carriageway, the seat is spring-deflected in an unchanged, substantially horizontal position. A spring-mounted seat pillar does not alleviate the loading in the region of the seat tip which acts in particular on the genitals/perineum region of the cyclist. US 2010/0199481 A1 discloses a seat pillar with a seat pillar tube, a seat pillar head fastened to one of the two ends of the seat pillar tube, and a clamping device, which is arranged on the seat pillar head, for a seat frame. The seat pillar head has an undefined pivot axis which runs substantially perpendicularly to the longitudinal axis of the seat pillar tube. The clamping device is arranged pivotably about said pivot axis counter to the force of a spring element. The spring element damps the forces transmitted by rigid components of the bicycle by a multi-dimensional movement of the clamping device about the mass center in the center of the seat pillar head being made possible. The movement is limited exclusively by the progressive spring action of the elastic spring element.

SUMMARY OF THE INVENTION

Starting from this prior art, the invention is based on the object of providing a seat pillar of the type mentioned at the beginning, which, in particular in the case of sports bikes, reduces the high loadings in the genitals/perineum region of the cyclist and restricts the maximum pivoting angle of the clamping device form a starting position by means of stop means.

This object is achieved in the case of a seat pillar of the type mentioned at the beginning in that the seat pillar head is configured as a hollow-cylindrical sleeve and a spacer disk having a round hole and a guide hole is arranged on both end sides of the sleeve, in each case for rotation therewith, the sleeve receives an elastic body as a spring element between the two spacer disks, a first and a second passage extend through the elastic body, the first passage is aligned with the round holes and the second passage is aligned with the guide holes, wherein the cross section of the guide holes is larger than the cross section of the second passage, a first bolt forming the pivot axis passes through the first passage and the round holes, and a second bolt passes through the second passage and the guide holes, the clamping device has an inner clamping part bearing against each spacer disk, and an outer clamping part which is in each case opposite the inner clamping part, for clamping a seat web of the seat frame between the inner and outer clamping parts, and the outer and inner clamping parts are fastened to the first and second bolts.

The seat pillar is inserted into the seat tube of the bicycle in such a manner that the pivot axis of the seat pillar head runs transversely with respect to the direction of travel. The clamping device fixing the seat frame is pivotable about said longitudinal axis counter to the force of the spring element. If, in the cycling mode, high loadings occur at the seat tip of the bicycle seat, said loadings are transmitted via the seat frame to the clamping device which pivots about the pivot axis counter to the force of the spring element. The loading on the genitals/perineum region of the cyclist is thereby reduced. The spring hardness of the spring element is preferably matched individually to the weight of the cyclist and to the use conditions. The spring element can act on the clamping device in front of and/or behind the pivot axis. If the spring element acts on the clamping device from the lower side in front of the pivot axis in the direction of travel, said spring element is configured as a compression spring element. If, however, the spring element acts on the upper side of the clamping device in front of the pivot axis in the direction of travel, said spring element is configured as a tension spring element. If the spring element is arranged behind the pivot axis in the direction of travel, the positions of the tension spring element and/or compression spring element are interchanged. The seat pillar head serves as an abutment for each spring element.

The spring characteristics of the spring element are preferably configured in such a manner that the seat pillar head pivots about the pivot axis only when a defined force value is exceeded. This has the effect that the seat pivots about the pivot axis only in the case of high, previously defined loadings and thereby alleviates, the loading on the genitals/perineum region of the cyclist. In the normal cycling mode on a substantially flat carriageway surface, an unnecessary input of energy into the spring element is thereby avoided, this being of particular importance in particular in the region of cycling sport.

The spring element is designed in particular as an elastic body which can consist, for example, of an elastomer or rubber. The first, roar bolt in the direction of travel of the fitted seat pillar forms the pivot axis, about which the clamping device is pivotably arranged. The second, front bolt in the direction of travel transmits the loading from the seat tip to the elastic body, which is subjected to a compressive stress below the second bolt. The spacer disks which are arranged on the end sides of the sleeve for rotation therewith serve, with the round holes thereof, as a mounting for the pivot axis, whereas guide holes, as stop means, restrict the pivoting angle of the clamping device. The guide hole is configured in particular as an elongated hole.

In order to be able to adjust the inclination of the seat in the starting position, in advantageous refinement of the invention the spacer disks engage by means of the circumferential edges thereof in a form-fitting manner in the sleeve and are fixable with the aid of a clamping mechanism for rotation therewith. If the spacer disks are configured to be circular-cylindrical and engage by means of the circumferential edges thereof in a correspondingly shaped sleeve, the inclination of the seat can be adjusted in an infinitely variable manner by rotation of the spacer disks clockwise and anticlockwise. The spacer disks preferably end flush with the end-side edges of the sleeve.

The spacer disks can be simply installed and positioned on the outer end sides of the sleeve by the elastic body completely filling the sleeve between the two spacer disks. The spacer disks then bear in a planar manner against those end sides of the elastic body which point outward transversely with respect to the direction of travel.

The first bolt forming the pivot axis passes through the round holes of the spacer disks preferably with a loose fit, in order to permit pivoting of the clamping device in a manner substantially unaffected by friction forces and associated breakaway torques.

Friction-reduced pivoting with adequate clamping at the same time of the seat webs between the inner and outer clamping parts is achieved in that surface of the inner clamping part which faces the spacer disk and/or that surface of each spacer disk which faces each inner clamping part are/is at least partially, preferably completely, provided with a friction-reducing coating. The coating can be, for example, a lubricant layer which is applied to the surface. Alternatively, the surface can be coated with Teflon or ceramic in order to reduce the frictional resistance. Finally, the friction-reducing surface can also consist of anodized aluminum.

The clamping parts are preferably designed as clamping plates. For better guidance of the seat webs of the seat frame, a groove can be arranged in each case in the inner and/or outer clamping plate.

In order to produce the required clamping force on the seat web between the inner and outer clamping parts, in a structurally advantageous refinement of the invention it is provided that the outer and inner clamping parts have passages which are aligned with the first and second passages in the elastic body, the first and second bolts each have an internal thread and, at opposite end-side ends of the bolt, the outer and the inner clamping parts are each fastened to the bolt by two screws engaging in the internal thread.

Another possibility for building up the required clamping force between the inner and outer clamping parts consists in that the bolt is configured as a threaded bolt which also passes through the passages of the inner and outer clamping parts. Nuts are screwed onto the end sides of the threaded bolt in order to build up the required clamping force in the axial direction of the bolt. Furthermore, the threaded bolt can be part of a conventional screw, wherein the inner and outer clamping parts are fastened to the bolt on one side by the screw head and on the opposite side by the nut. The required clamping force is built up between the inner and outer clamping parts in the axial direction of the bolt by tightening of the nut.

In order to avoid rotation of the clamping parts relative to each other during the tightening of the screws, a locking means is provided in each case between the outer and inner clamping parts, in an advantageous refinement of the invention. The locking means comprises, for example, a spike-shaped extension on one of the clamping parts, said extension engaging in a corresponding depression in the opposite clamping part and thereby centering the outer and inner clamping parts with respect to each other.

BRIEF DESCRIPTION OF THE DRAWINGS

The invention is explained in more detail below with reference to the figures, in which:

FIG. 1a shows a side view of a seat pillar according to the invention with the clamping device removed, FIG. 1b shows a top view of the seat pillar according to FIG. 1a, FIG. 2 shows a section along the line A-A according to FIG. 1a, but with the clamping device fitted, FIG. 3a shows a side view of a spring element of a seat pillar according to the invention, FIG. 3b shows a side view of a spacer disk of a seat pillar according to the invention, FIG. 4a shows a front view of an outer clamping part of the clamping device, FIG. 4b shows a side view of the clamping part according to FIG. 4a, and FIG. 4c shows a rear view of the clamping part according to FIG. 4a, FIG. 5a shows a front view of an inner clamping part of the clamping device, FIG. 5b shows a side view of the clamping part according to FIG. 5a, and FIG. 5c shows a rear view of the clamping part according to FIG. 5a.

DETAILED DESCRIPTION OF THE PREFERRED EMBODIMENTS

Figure 2:
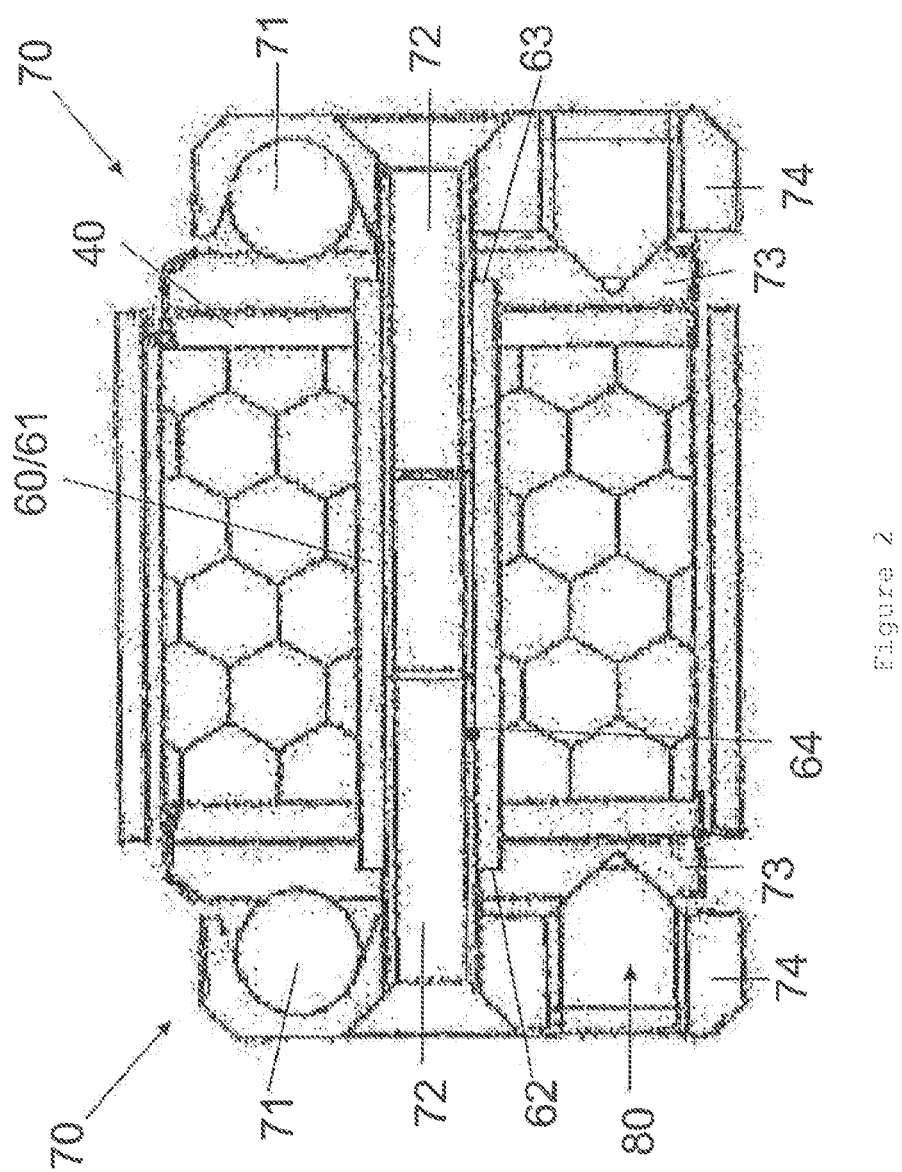

FIGS. 1a, b show a seat pillar (10) with a seat pillar tube (20), the lower end (21) of which, in FIG. 1a, is intended for reception in a seat tube (not illustrated) of a bicycle frame and, at the opposite, upper end (22) of which, a seat pillar head (30) is arranged. The seat pillar tube (20) has, for example, a circular-cylindrical diameter with a tube longitudinal axis (23); however, it may also be oval. The seat pillar head (30) is designed as a cross-sectionally circular, hollow-cylindrical sleeve (31) having a sleeve longitudinal axis (32) which runs perpendicularly to the plane of the image and to the tube longitudinal axis (23) of the seat pillar tube (20). The casing (33) of the hollow-cylindrical sleeve is fixedly connected to the upper end (22) of the seat pillar tube (20), for example by means of welding or brazing. Alternatively, the hollow-cylindrical sleeve (31) can be formed integrally with the seat pillar tube (20), for example in the form of a diecast part. The hollow-cylindrical sleeve (31) has a longitudinal slot (34) extending over the entire length thereof. Along the upper and lower edges of the longitudinal slot (34), an upper clamping section (35) and a lower clamping section (36) extend radially outward from the casing (33). The upper and the lower clamping sections (35, 36) each have two bores (37) aligned with each other. The bores (37) serve for receiving clamping screws (not illustrated). The width of the longitudinal slot (34) can be changed by tightening of the clamping screws passing through the bores (37) in the upper and lower clamping sections (35, 36).

The seat pillar (10) is accommodated in the seat tube (not illustrated) of the bicycle frame in such a manner that the sleeve longitudinal axis (32) of the hollow-cylindrical sleeve (31) runs transversely with respect to the plane spanned by the bicycle frame and therefore transversely with respect to the direction of travel. In the exemplary embodiment, the clamping sections (35, 36) are located at the rear in the direction of travel, but can also be arranged at the front in the direction of travel.

A spacer disk (40) is arranged on the end sides (38, 39) of the hollow-cylindrical sleeve (31), in each case for rotation therewith (cf. FIG. 3b). The spacer disk (40) engages by means of the circumferential edge (41) thereof in a form-fitting manner in the sleeve (31). The spacer disks (40), which are arranged the end sides, are fixed in the hollow-cylindrical sleeve (31) for rotation therewith by tightening of the clamping screws (not illustrated).

The spacer disk (40) has a round hole (42) at the rear in the direction of travel. The round hole (42) is located eccentrically level with sleeve longitudinal axis (32). A guide hole (43) which is configured as an elongated hole is likewise located eccentrically level with the sleeve longitudinal axis (32), but offset forward in the direction of travel. The guide hole (43) is limited by a semicircular upper stop (44) and a semicircular lower stop (45).

The hollow-cylindrical sleeve (31) receives an elastic body (50), apparent from FIG. 2 and FIG. 3a, between the two spacer disks arranged on the end sides (38, 39). The elastic body (50) is designed as a circular cylinder, the length of which corresponds to the length of the hollow-cylindrical sleeve (31) reduced by twice the thickness of the spacer disks (40). The elastic body (50) is composed in particular of an elastomer. The diameter (51) of the elastic body (50) corresponds to the internal diameter of the hollow-cylindrical sleeve (31). A first passage (53) and a second passage (50) extend through the elastic body (50) parallel to the longitudinal axis thereof. The first passage (53) is aligned with the round hole (42) in the spacer disks (40), whereas the second passage (54) is aligned with the guide hole (43) in the spacer disks (40). The position of the guide hole (43) with respect to the second passage (54) in the starting position of the seat pillar (10) is indicated by means of the solid line (55) in FIG. 3a. It can clearly be seen that the cross section of the guide holes (43) is approximately 40% larger than the cross section of the second passage (54). The diameter of the second passage (54) corresponds to the diameter of the semicircular upper and lower stops (44, 45) of the guide hole (43). The diameter of the round hole (42) in the spacer disks and of the first passage (53) correspond.

As is apparent in particular from FIG. 2, a first bolt (60) forming a pivot axis (61) passes through the first passage (53) in the elastic body (50) and through the round holes (42) in the spacer disks (40). The external diameter of the bolt (60) corresponds in the technical sense to the internal diameter of the round holes (42) and of the first passage (53) such that the bolt (60) is guided with a loose fit. The length of the bolt (60) is slightly larger the length of the hollow-cylindrical sleeve (31), and therefore the end-side ends (63) slightly protrude beyond the outwardly facing surface of the spacer disks (40). The bolt (60) is designed as a hollow cylinder with an internal thread (64).

The second passage (54) in the elastic body (50) is passed through by a further bolt which corresponds to the bolt (60) and likewise slightly protrudes beyond the surfaces of the spacer disks (40). This ensures that the second bolt received by the elastic body (50) can move at maximum between the upper stop (44) and the lower stop (45) of the guide hole (43).

The clamping device (70) for seat webs (71) of a seat frame of a bicycle seat (not illustrated) is fastened to the bolt (60) on both sides of the two bolts (60) by two screws (72) engaging in each case in the internal thread of the bolt (60). The clamping device (70) comprises an inner clamping part (73) bearing against each of the two spacer disks (40) and an outer clamping part (74), which is in each case opposite the inner clamping part (73), for clamping the seat web (71) between the inner and outer clamping parts (73, 74). The inner and the outer clamping parts (73, 74) have passages (75, 76) aligned with the first and second passages (53, 54) of the elastic body (50). The diameter of the passages (75, 76) is larger than or equal to the external diameter of the thread of the screws (72), and therefore the latter can bolts (60).

A longitudinal groove (77) arranged above the passages (76) can be seen from the side view and rear view of the outer clamping part (74). The inner clamping part (73) has a deep longitudinal groove (78) lying opposite. The longitudinal grooves (77, 78) each comprise one of the seat webs (71) of the seat frame, which is thereby guided and braced securely between the clamping plates (73, 74).

The rear side (illustrated in FIG. 5C) of the inner clamping part (73) is provided with a friction-reducing coating (79) in order to reduce the friction between the inner clamping part (73) and the surface of the spacer disks (40) during pivoting of the clamping device about the pivot axis (61). The coating (79) is applied preferably over the full surface area on the rear surface of the inner clamping parts (73).

Finally, a locking means (80) is arranged between the inner and the outer clasping parts (73, 74). As is apparent in particular from FIGS. 2 and 4, the locking means (80) comprises a spike-shaped extension (81) which is arranged below the passages (76) and engages in a corresponding depression (82) in the inner clamping part (73). The length of that section of the extension (81) which protrudes beyond that surface of the outer clamping part (74) which faces the inner clamping part (73) is dimensioned in such a manner that the clapping action on the seat webs (71) is not adversely affected. With the seat webs (71) fully braced, the extension (81) preferably engages in a form-fitting manner in the depression (82), but without touching the base thereof.

The functioning of the seat pillar (10) during operation on a sports bike is explained in more detail below:

The spring rate of the elastic body (50) is determined in such a manner that the bolt (60) bears against the upper stop (44) of the spacer disk (40) both when the seat is unloaded and also during loading in the normal cycling mode, that is to say in the case of loadings in which no unpleasant, high pressure peaks are exerted on the genitals/perineum region of the cyclist. If, however, as a consequence of rough unevennesses of the ground, potholes or other disturbances in the carriageway surface, impermissible loadings adversely affecting the wellbeing of the cyclist occur in the genitals/perineum region, such high forces are introduced into the clamping device (70) via the seat webs (71) that the clamping device (70) pivots about the pivot axis (61). In the process, the bolt (60) migrates out of the starting position thereof on the upper stop (44) of the spacer disk (40) in the direction of the lower stop (45) of the guide hole (43) counter to the restoring force of the elastic body (50). The maximum spring travel is limited by the lower stop (45) and therefore, even at extremely high loadings, hazardous inclinations of the bicycle seat forward in the direction of travel cannot occur.

Pressure peaks in event the of uneven carriageway surfaces are mitigated by the bicycle seat yielding forward. However, depending on the adjustment of the spring rate of the elastic body, the transmission of vibrations through the seat pillar to the bicycle seat can also be reduced.

A further advantage of the seat pillar according to the invention consists in that the increased pressure of the seat tip on the genitals/perineum region of the cyclist that occurs because of the more oblique position of the cyclist's pelvis in the sporty sitting position (for example in the dropdown handlebar position on a racing bike or because of a seat position inclined forwards to a greater extent when cycling uphill on steep inclines, especially in the case of mountain biking) is reduced by the fact that the bicycle seat yields forward and downward under the increased pressure and somewhat adapts its position in the horizontal to the new position of the pelvis—specifically, even on a flat carriageway.

| List of reference numbers | |
|---|---|
| No. | Designation |
| 10 | Seat pillar |
| 20 | Seat pillar tube |
| 21 | Lower end |
| 22 | Upper end |
| 23 | Longitudinal axis |
| 30 | Seat pillar head |
| 31 | Hollow-cylindrical sleeve |
| 32 | Longitudinal axis |
| 33 | Casing |
| 34 | Longitudinal slot |
| 35 | Upper clamping section |
| 36 | Lower clamping section |
| 37 | Bores |
| 38, 39 | End sides |
| 40 | Spacer disk |
| 41 | Circumferential edge |
| 42 | Round hole |
| 43 | Guide hole |
| 44 | Upper stop |
| 45 | Lower stop |
| 50 | Elastic body |
| 51 | Diameter |
| 52 | Longitudinal axis |
| 53 | First passage |
| 54 | Second passage |
| 55 | Line |
| 60 | Bolt |
| 61 | Pivot axis |
| 62 | End-side end |
| 63 | End-side end |
| 64 | Internal thread |
| 70 | Clamping device |
| 71 | Seat web |
| 72 | Screws |
| 73 | Inner clamping part |
| 74 | Outer clamping part |
| 75 | Passage, inner clamping part |
| 76 | Passage, outer clamping part |
| 77 | Longitudinal groove |
| 78 | Longitudinal groove |
| 79 | Coating |
| 80 | Locking means |
| 81 | Extension |
| 82 | Depression |

The invention claimed is:

1. A seat pillar, comprising:
a seat pillar tube having two ends and a tube longitudinal axis along a length of the tube;
a seat pillar head fastened to one of the two ends of the seat pillar tube, the seat pillar head configured as a hollow-cylindrical sleeve having a pivot axis perpendicular to the tube longitudinal axis of the seat pillar tube;
a spring element comprising an elastic body arranged in said hollow-cylindrical sleeve, a first passage and a second passage extending through the elastic body;
two spacer disks arranged at opposing end sides of the hollow-cylindrical sleeve and fixed with respect to rotation relative to the hollow-cylindrical sleeve, the spring element disposed between the two spacer disks, wherein each of the spacer disks includes a round hole aligned with the first passage and a guide hole aligned with the second passage, a first cross-sectional area of the guide hole being larger than a second cross-sectional area of the second passage;
a first bolt forming the pivot axis passes through the first passage and the round holes;
a second bolt passes through the second passage and the guide holes;
a clamping device arranged on the seat pillar head, the clamping device being pivotable about the pivot axis and having two clamping assemblies, each of the clamping assemblies comprising an inner clamping part bearing against a respective one of the two spacer disks, and an outer clamping part facing the inner clamping part, for clamping a seat web of a seat frame between the inner clamping part and the outer clamping part, each of the inner clamping part and the outer clamping part being fastened to the first bolt and the second bolt.

2. The seat pillar of claim 1, wherein the spacer disks have circumferential edges engaging in the sleeve and are fixable by the clamping mechanism to the hollow-cylindrical sleeve so that the spacer disks are fixed with respect to rotation relative to the hollow-cylindrical sleeve.

3. The seat pillar of claim 1, wherein the elastic body completely fills the hollow-cylindrical sleeve between the two spacer disks.

4. The seat pillar of claim 1, wherein the first bolt forming the pivot axis passes through the round holes of the spacer disks with a loose fit.

5. The seat pillar of claim 1, further comprising a friction-reducing coating disposed on one of:
a surface of each the inner clamping part that faces the respective one of the spacer disks; and
a surface of each of the two spacer disks that faces the respective inner clamping part.

6. The seat pillar of claim 1, wherein each of the inner clamping part and the outer clamping part is a clamping plate.

7. The seat pillar of claim 1, wherein the inner clamping part and the outer clamping part each have passages aligned with the first passage and the second passage, respectively;
the first bolt and the second bolt each have an internal thread; and
each of the clamping assemblies is fastened to the bolts by a threaded fastener engaging the internal thread.

8. The seat pillar of claim 1, further comprising a locking device between the outer clamping part and the inner clamping part of each of the clamping assemblies.

* * * * *